United States Patent
Okura et al.

(10) Patent No.: US 9,850,376 B2
(45) Date of Patent: Dec. 26, 2017

(54) POLYESTER RESIN COMPOSITION AND METHOD FOR PRODUCING SAME

(71) Applicant: KANEKA CORPORATION, Osaka-shi (JP)

(72) Inventors: Tetsuo Okura, Settsu (JP); Ryohei Koyama, Settsu (JP)

(73) Assignee: KANEKA CORPORATION, Osaka-shi (JP)

( * ) Notice: Subject to any disclaimer, the term of this patent is extended or adjusted under 35 U.S.C. 154(b) by 0 days.

(21) Appl. No.: 14/433,504

(22) PCT Filed: Oct. 1, 2013

(86) PCT No.: PCT/JP2013/005851
§ 371 (c)(1),
(2) Date: Apr. 3, 2015

(87) PCT Pub. No.: WO2014/054278
PCT Pub. Date: Apr. 10, 2014

(65) Prior Publication Data
US 2015/0232660 A1    Aug. 20, 2015

(30) Foreign Application Priority Data
Oct. 5, 2012  (JP) .................. 2012-223513

(51) Int. Cl.
C08G 18/42   (2006.01)
C08L 67/04   (2006.01)
C08L 67/02   (2006.01)
C08K 3/36    (2006.01)
C08K 13/02   (2006.01)
C08K 5/00    (2006.01)
C08K 5/10    (2006.01)

(52) U.S. Cl.
CPC .............. C08L 67/04 (2013.01); C08K 3/36 (2013.01); C08K 13/02 (2013.01); C08L 67/02 (2013.01); C08K 5/0016 (2013.01); C08K 5/10 (2013.01); C08L 2205/02 (2013.01)

(58) Field of Classification Search
CPC  C08L 67/04; C08L 67/02; C08K 3/36; C08K 5/0016; C08K 5/10; C08K 13/02
USPC ....................................... 524/539
See application file for complete search history.

(56) References Cited

U.S. PATENT DOCUMENTS

2005/0272843 A1    12/2005  Kobayashi et al.
2006/0276575 A1*   12/2006  Hamaguchi ............ C08K 5/103
                                                524/308
2009/0162683 A1*   6/2009   Douard .................... C08K 5/42
                                                428/480
2009/0209695 A1*   8/2009   Yu ........................... C08L 67/02
                                                524/451
2010/0063177 A1*   3/2010   Takenaka ................. C08K 5/10
                                                523/124
2011/0189414 A1*   8/2011   Whitehouse ......... C08K 5/0083
                                                428/35.7
2011/0190430 A1    8/2011   Nakamura
2012/0157581 A1*   6/2012   Lib .......................... C08J 3/18
                                                524/47

FOREIGN PATENT DOCUMENTS

| | | |
|---|---|---|
| EP | 1 837 363 A1 | 9/2007 |
| JP | 2004-189991 A | 7/2004 |
| JP | 2005-170426 A | 6/2005 |
| JP | 2006-028219 A | 2/2006 |
| JP | 2006-045365 A | 2/2006 |
| JP | 2009-527596 A | 7/2009 |
| JP | 2009-221337 A | 10/2009 |
| JP | 2011-510106 A | 3/2011 |
| WO | WO 2007/095711 A1 | 8/2007 |
| WO | WO 2009/077860 A2 | 6/2009 |
| WO | WO 2010/013483 A1 | 2/2010 |

OTHER PUBLICATIONS

International Search Report dated Dec. 24, 2013 in PCT/JP2013/005851 filed Oct. 1, 2013.
Extended European Search Report dated May 6, 2016 in Patent Application No. 13843254.7.

* cited by examiner

*Primary Examiner* — Jane L Stanley
(74) *Attorney, Agent, or Firm* — Oblon, McClelland, Maier & Neustadt, L.L.P.

(57) ABSTRACT

A resin composition for producing a film or sheet having high tear strength that is excellent in processability, mechanical properties, and biodegradability. The resin composition is a biodegradable polyester resin composition containing: (i) an aliphatic polyester (P3HA) having a repeating unit of formula (1): [—CHR—$CH_2$—CO—O—] (1), wherein R is an alkyl group represented by $C_nH_{2n+1}$, where n is an integer of 1 or more and 15 or less; (ii) polybutylene adipate terephthalate (PBAT); and hydrophilic silica (A), wherein a weight ratio of the aliphatic polyester (P3HA) to the polybutylene adipate terephthalate (PBAT) is 90/10 to 10/90, and an amount of the hydrophilic silica (A) is 2 to 30 parts by weight with respect to 100 parts by weight of a total amount of the aliphatic polyester (P3HA) and the polybutylene adipate terephthalate (PBAT) combined.

6 Claims, No Drawings

POLYESTER RESIN COMPOSITION AND METHOD FOR PRODUCING SAME

TECHNICAL FIELD

The present invention relates to a polyester resin composition, and particularly relates to a polyester resin composition that contains a high proportion of poly(3-hydroxyalkanoate) excellent in biodegradability and is suitable for use in producing a sheet or film having high tear strength, and a method for producing such a polyester resin composition.

BACKGROUND ART

In recent years, environmental problems caused by waste plastics have come to the fore, and the realization of a recycling-based society on a global scale has been desired. Under the circumstances, biodegradable plastics have received attention which are decomposed into water and carbon dioxide after use by the action of microorganisms. Further, in Europe etc. where kitchen garbage is treated by composting, there has been a demand for garbage bags that can be put in compost together with garbage. Examples of biodegradable plastics include poly(3-hydroxyalkanoate) (hereinafter, referred to as P3HA), polycaprolactone, polybutylene adipate terephthalate, polybutylene succinate adipate, or polybutylene succinate, and films and sheets using these biodegradable plastics have been developed. Particularly, among these biodegradable plastics, P3HA has the most excellent biodegradability, and therefore can be treated by various biodegradation processes such as composting at about ordinary temperature and anaerobic degradation. Therefore, from the viewpoint of biodegradability, it is preferred that P3HA is used singly or a resin composition containing a high proportion of P3HA and another biodegradable resin is used.

As conventional film and sheet excellent in biodegradability, for example, a film comprising poly(3-hydroxybutyrate-co-3-hydroxyhexanoate) (abbreviation: PHBH) produced by a microorganism (see Patent Document 1), and a sheet comprising a resin composition containing a petroleum-based resin, such as polybutylene adipate terephthalate, polybutylene succinate adipate, polybutylene succinate, or polycaprolactone, and PHBH (see Patent Document 2) have been disclosed.

However, when an aliphatic polyester produced by a microorganism, such as PHBH, or a resin composition containing such an aliphatic polyester is formed into a film or sheet by film blowing or T-die extrusion, the resulting film or sheet is poor in MD-tear strength.

As means for improving the rigidity and toughness of a biodegradable and/or biomass-derived resin, blending the resin with surface-coated inorganic particles to obtain a composition has been disclosed (see Patent Document 3).

However, polylactic acid disclosed in Patent Document 3 is originally poor in tear strength, and therefore its tear strength is still poor even after blending with inorganic particles. On the other hand, unlike polylactic acid, P3HA tends to have a lower molecular weight in an acid or basic environment, and therefore it is difficult to improve its tear strength by using coated inorganic particles.

Blending with silica has also been disclosed. For example, blending of an aliphatic polyester resin and an aromatic-aliphatic polyester resin with inorganic particles having a specific particle size to obtain a composition having improved tear strength has been disclosed (see Patent Document 4). However, the tear strength of the composition is insufficient to continuously produce a film or sheet. Further, there is no description about a case where the aliphatic polyester resin is P3HA and a case where the inorganic particles are silica particles. Further, a composition obtained by blending a polylactic acid-based aliphatic polyester resin, a plasticizer, and hydrophilic silica has been disclosed (see Patent Document 5). However, blending with the hydrophilic silica is intended to improve heat resistance to the polylactic acid-based resin, and there is no disclosure about improvement in the tear strength of a resin comprising P3HA and PBAT. Also, a composition comprising silicon dioxide, a plasticizer, and a biodegradable resin, such as polylactic acid, has been disclosed (see Patent Document 6). However, blending with the silica is the technique of uniformly dispersing the plasticizer in the rigid biodegradable plastic to improve flexibility, and therefore the silica is used as a carrier of the plasticizer to uniformly disperse the plasticizer. On the other hand, the present invention is applied to soft biodegradable plastics, and therefore does not have such a problem and is different in technical idea. Further, there is no disclosure about improvement in the tear strength of a resin comprising P3HA and PBAT which is the object of the present invention.

Further, a composition comprising polyhydroxybutyrate that is one of P3HAs, a plasticizer, and a crystal nucleating agent has been disclosed (see Patent Document 7). However, blending of the resin having a high melting point with the plasticizer is intended to suppress thermal degradation during processing, and therefore tear strength is poorly improved.

CITATION LIST

Patent Documents

Patent Document 1: JP-A-2006-045365
Patent Document 2: WO 2010/013483
Patent Document 3: JP-T-2011-510106
Patent Document 4: JP-A-2009-221337
Patent Document 5: JP-A-2004-189991
Patent Document 6: JP-T-2006-028219
Patent Document 7: JP-T-2009-527596

SUMMARY OF INVENTION

Technical Problem

In view of the above, it is an object of the present invention to provide a resin composition that is suitable for use in producing a film or sheet having high tear strength and is excellent in transparency, processability, mechanical properties, and biodegradability.

Solution to Problem

In order to achieve the above object, the present inventors have intensively studied, and as a result, have finally found that blending of a resin composition comprising P3HA and PBAT with hydrophilic silica makes it possible to significantly improve the MD (resin flow direction, Machine Direction)-tear strength of a film or sheet obtained from a resin composition according to the present invention.

That is, in order to achieve the above object, the present invention is directed to a biodegradable polyester resin composition comprising an aliphatic polyester (P3HA) having a repeating unit represented by the following general formula (1)

$$[-CHR-CH_2-CO-O-] \qquad (1)$$

(wherein R is an alkyl group represented by $C_nH_{2n+1}$ and n is an integer of 1 or more and 15 or less), polybutylene adipate terephthalate (PBAT), and hydrophilic silica (A), wherein a weight ratio of the aliphatic polyester (P3HA) to the polybutylene adipate terephthalate (PBAT) is 90/10 to 10/90, and an amount of the hydrophilic silica (A) contained is 2 to 30 parts by weight with respect to 100 parts by weight of a total amount of the aliphatic polyester (P3HA) and the polybutylene adipate terephthalate (PBAT) contained.

The aliphatic polyester (P3HA) is preferably at least one selected from the group consisting of poly(3-hydroxybutyrate-co-3-hydroxyhexanoate (PHBH), poly(3-hydroxybutyrate) (P3HB), poly(3-hydroxybutyrate-co-3-hydroxyvalerate) (PHBV), poly(3-hydroxybutyrate-co-4-hydroxybutyrate) (P3HB4HB), poly(3-hydroxybutyrate-co-3-hydroxyoctanoate), and poly(3-hydroxybutyrate-co-3-hydroxyoctadecanoate), and the hydrophilic silica (A) is preferably precipitated silica.

Further, the weight ratio of the aliphatic polyester (P3HA) to the polybutylene adipate terephthalate (PBAT) is preferably 50/50 to 90/10.

Further, a plasticizer (B) is preferably contained in an amount of 2 to 30 parts by weight with respect to 100 parts by weight of the total amount of the aliphatic polyester (P3HA) and the polybutylene adipate terephthalate (PBAT) contained. The plasticizer (B) is preferably at least one selected from glycerin ester-based compounds, adipate-based compounds, and polyether ester-based compounds.

Further, the polyester resin composition according to the present invention is preferably intended for processing of film or sheet.

The present invention is also directed to a polyester resin formed article obtained from the polyester resin composition. The polyester resin formed article is preferably in a form of film or sheet.

The present invention is also directed to a method for producing the polyester resin composition, comprising: a first step of melt-kneading the aliphatic polyester (P3HA) and the hydrophilic silica (A) to prepare a resin composition; and a second step of melt-kneading the resin composition prepared in the first step with the polybutylene adipate terephthalate (PBAT). In the first step, the plasticizer (B) is preferably added.

Advantageous Effects of Invention

According to the present invention, it is possible to provide a polyester-based resin composition containing a high proportion of an aliphatic polyester excellent in transparency, processability, mechanical properties, and biodegradability, particularly a film or sheet having high MD-tear strength.

DESCRIPTION OF EMBODIMENTS

Hereinbelow, an embodiment of a polyester resin composition according to the present invention will be described, but the present invention is not limited thereto.

[Aliphatic Polyester (P3HA)]

The polyester resin composition according to the present invention contains, as a resin component, an aliphatic polyester (P3HA) having a repeating unit represented by the following general formula (1)

(wherein R is an alkyl group represented by $C_nH_{2n+1}$, and n is an integer of 1 or more and 15 or less) and polybutylene adipate terephthalate (PBAT), and further contains hydrophilic silica (A).

The aliphatic polyester (P3HA) used in the present invention is a polyester resin that is referred to as poly(3-hydroxyalkanoate) and produced by a microorganism.

The microorganism that produces the P3HA is not particularly limited as long as the microorganism has the ability to produce P3HAs. Examples of a microorganism that produces a copolymer of hydroxybutyrate and another hydroxyalkanoate include *Aeromonas caviae* that produces a copolymer having 3-hydroxybutyrate and 3-hydroxyvalerate as monomer units (hereinafter, abbreviated as "PHBV") and poly(3-hydroxybutyrate-co-3-hydroxyhexanoate) (hereinafter, abbreviated as "PHBH") and *Alcaligenes eutrophus* that produces poly(3-hydroxybutyrate-co-4-hydroxybutyrate). Particularly, as a microorganism that produces PHBH, for example, *Alcaligenes eutrophus* AC32 strain (FERM BP-6038) (J. Bacteriol., 179, p. 4821 to 4830 (1997)) is more preferred which is produced by introducing a PHA synthetic enzyme gene into *Alcaligenes eutrophus* to enhance PHBH productivity. Such a microorganism is cultured under appropriate conditions to accumulate PHBH in its cells, and the cells are used.

From the viewpoint of balance between processability and physical properties, the weight-average molecular weight of the P3HA used in the present invention is preferably 50,000 to 3,000,000, more preferably 100,000 to 1,500,000. It is to be noted that the weight-average molecular weight is determined based on the molecular weight distribution of polystyrene measured by gel permeation chromatography (GPC) using chloroform as an eluant.

The P3HA used in the present invention is preferably one having a repeating unit represented by the above general formula (1) wherein n of the alkyl group (R) is 1 or one having a repeating unit represented by the above general formula (1) wherein n is 1 and a repeating unit represented by the above general formula (1) wherein n is at least one of 2, 3, 5, and 7, and is more preferably one having a repeating unit represented by the above general formula (1) wherein n is 1 and a repeating unit represented by the above general formula (1) wherein n is 3.

Specific examples of the P3HA include poly(3-hydroxybutyrate) (abbreviation: P3HB), poly(3-hydroxybutyrate-co-3-hydroxyhexanoate) (abbreviation: PHBH), poly(3-hydroxybutyrate-co-3-hydroxyvalerate) (abbreviation: PHBV), poly(3-hydroxybutyrate-co-4-hydroxybutyrate) (abbreviation: P3HB4HB), poly(3-hydroxybutyrate-co-3-hydroxyoctanoate), and poly(3-hydroxybutyrate-co-3-hydroxyoctadecanoate). PHBH, P3HB, PHBV, P3HB4HB, poly(3-hydroxybutyrate-co-3-hydroxyoctanoate), and poly(3-hydroxybutyrate-co-3-hydroxyoctadecanoate) are preferred for their excellent biodegradability.

Among them, P3HB, PHBH, PHBV, and P3HB4HB are easily industrially produced.

Among them, PHBH is preferred which has a repeating unit represented by the above general formula (1) wherein n of the alkyl group (R) is 1 and a repeating unit represented by the above general formula (1) wherein n is 3, in light of the fact that its melting point and crystallinity can be changed by changing the content ratio between the repeating units to change physical properties, such as Young's modulus and heat resistance, so that physical properties intermediate between polypropylene and polyethylene can be imparted, and PHBH can be easily industrially produced as described above and is a useful plastic in terms of physical properties. A specific method for producing PHBH is described in, for example, WO 2010/013483 (Patent Document 2). An example of commercially-available PHBH is "AONILEX" (trademark) manufactured by KANEKA CORPORATION.

From the viewpoint of balance between flexibility and strength, the content ratio between the repeating units of PHBH, that is, the content ratio of 3-hydroxybutyrate to 3-hydroxyhexanoate is preferably 80/20 to 99/1 (mol/mol), more preferably 75/15 to 97/3 (mol/mol). The reason for this is that the content ratio is preferably 99/1 or less from the viewpoint of flexibility and is preferably 80/20 or more from the viewpoint of imparting appropriate hardness to the resin.

Further, the melting point, Young's modulus, etc. of PHBV change depending on the ratio between a 3-hydroxybutyrate (3HB) component and a 3-hydroxyvalerate (3HV) component, but the crystallinity of PHBV is as high as 50% or more due to cocrystallization between the 3HB component and the 3HV component. Therefore, PHBV is more flexible than poly(3-hydroxybutyrate) (P3HB), but tends to have breaking elongation as low as 50% or less.

[Polybutylene Adipate Terephthalate (PBAT)]

The polybutylene adipate terephthalate (PBAT) used in the present invention refers to a random copolymer of 1,4-butanediol, adipic acid, and terephthalic acid. Particularly, PBAT described in, for example, JP-T-10-508640 is preferred which is obtained by the reaction of a mixture containing (a) a mixture mainly comprising 35 to 95 mol % of adipic acid, its ester-forming derivative, or a mixture of them and 5 to 65 mol % of terephthalic acid, its ester-forming derivative, or a mixture of them (sum of individual mole percentages is 100) and a mixture containing (b) butanediol (mole ratio of (a) to (b) is 0.4:1 to 1.5:1). An example of commercially-available PBAT is "Ecoflex" (trademark) manufactured by BASF.

The weight ratio of the P3HA to the PBAT (P3HA/PBAT) in the polyester resin composition according to the present invention is not particularly limited, but is preferably 10/90 to 90/10 because a resulting film or sheet is excellent in tear strength and has appropriate hardness. Further, the weight ratio is preferably 50/50 or more because the composition is excellent in biodegradability, especially biodegradability at low temperature.

[Hydrophilic Silica (A)]

The hydrophilic silica (A) used in the present invention is silica having silanol groups that are silicon-bonded hydroxyl groups. The hydrophilic silica (A) has mainly hydroxyl groups on its surface. It is to be noted that the hydrophilic silica (A) has a refractive index relatively close to that of the P3HA, and is therefore preferred from the viewpoint of achieving excellent transparency of the resin composition or a formed article thereof.

Examples of the hydrophilic silica (A) used in the present invention include precipitated silica and fumed silica. Specific examples of precipitated silica include "Nipsil" (trademark) manufactured by TOSOH SILICA CORPORATION, "CARPLEX" (trademark) manufactured by Evonik, "SYLYSIA" (trademark) manufactured by FUJISILYSIA CHEMICAL LTD., and "SYLOPHOBIC" (trademark) manufactured by FUJISILYSIA CHEMICAL LTD. Specific examples of fumed silica include "AEROSIL" (trademark) manufactured by NIPPON AEROSIL CO., LTD., "REOLOSIL" (trademark) manufactured by Tokuyama Corporation, and "EXCELICA" (trademark) manufactured by Tokuyama Corporation.

Particularly, precipitated silica is preferred for its high tear strength-improving effect.

Here, precipitated silica is silica obtained by the reaction of silicate soda and sulfuric acid in water, and fumed silica is silica obtained by the reaction of silicon chloride, hydrogen, and oxygen under high temperature.

The amount of the hydrophilic silica (A) contained in the polyester according to the present invention is 2 to 30 parts by weight, preferably 4 to 20 parts by weight with respect to 100 parts by weight of the total amount of the P3HA and the PBAT contained. If the hydrophilic silica (A) content is less than 2 parts by weight, there is a case where tear strength is low. On the other hand, if the hydrophilic silica (A) content exceeds 30 parts by weight, there is a case where a film or sheet obtained from the resin composition is poor in flexibility.

Further, the primary particle size of the hydrophilic silica (A) preferably used in the present invention is not particularly limited as long as a resulting film or sheet can have improved tear strength and is less likely to have appearance defects such as fish-eyes and its transparency is not significantly impaired. However, from the viewpoint of easily obtaining the effect of improving mechanical properties such as tear strength and achieving excellent transparency, the primary particle size of the hydrophilic silica (A) is preferably 0.001 μm to 0.1 μm, particularly preferably 0.005 μm to 0.05 μm.

Here, the primary particle size of the hydrophilic silica (A) can be measured by laser diffraction scattering.

[Plasticizer (B)]

The above-described resin component of the polyester resin composition according to the present invention may further be blended with a plasticizer (B) to further improve tear strength.

Examples of the plasticizer include glycerin ester-based compounds, adipate-based compounds, polyether ester-based compounds, phthalate-based compounds, isosorbide ester-based compounds, and polycaprolactone-based compounds. Among them, modified glycerin-based compounds such as glycerin diaceto-monolaurate, glycerin diaceto-monocaprylate, and glycerin diaceto-monodecanoate, adipate-based compounds such as diethyl hexyl adipate, dioctyl adipate, and diisononyl adipate, and polyether ester-based compounds such as polyethylene glycol dibenzoate, polyethylene glycol dicaprylate, and polyethylene glycol diisostearate are preferred because they are excellent in affinity for the resin component and are less likely to bleed. Further, the plasticizer particularly preferably contains a high proportion of a biomass-derived component because the biomass content of the composition can be increased as a whole. An example of such a plasticizer is "RIKEMAL" (trademark) PL series manufactured by RIKEN VITAMIN Co., Ltd.

From the viewpoint of excellent compatibility with the P3HA, the plasticizer (B) used in the present invention is preferably at least one selected from glycerin ester-based compounds, adipate-based compounds, and polyether ester-based compounds.

The amount of the plasticizer (B) contained in the resin composition according to the present invention is 2 to 30 parts by weight, preferably 4 to 20 parts by weight with respect to 100 parts by weight of the total amount of the P3HA and the PBAT contained. If the plasticizer (B) content is less than 2 parts by weight, there is a case where the effect of improving tear strength is poor. On the other hand, if the plasticizer (B) content exceeds 30 parts by weight, the effect of improving tear strength is not enhanced in proportion to the plasticizer (B) content, and the plasticizer (B) may cause bleeding.

[Additive]

The resin composition according to the present invention may contain one or more aliphatic polyester-based resins, such as polybutylene succinate adipate and polybutylene succinate, and/or other resins as long as the effects of the present invention are not impaired.

Further, the resin composition according to the present invention may contain one or more materials usually used as additives, such as fillers other than silica, coloring agents such as pigments and dyes, odor absorbers such as activated carbon and zeolite, perfumes such as vanillin and dextrin, oxidation inhibitors, antioxidants, weatherability improvers, ultraviolet absorbers, lubricants, release agents, water repellents, antibacterial agents, slidability improvers, and other secondary additives as long as the effects of the present invention are not impaired.

[Method for Producing Polyester Resin Composition]

Hereinbelow, an embodiment of a method for producing the polyester resin composition according to the present invention will be described, but the present invention is not limited thereto.

The resin composition according to the present invention can be produced using a known mixer such as a single screw extruder, a twin screw extruder, or a Banbury mixer. Among them, the mixer is preferably a twin screw extruder because the hydrophilic silica (A) and the plasticizer (B) which is added if necessary can be dispersed in the resin without applying excessive shear to the resin. As for the setting condition of the mixer, a cylinder preset temperature is preferably 180° C. or less because the thermal decomposition of the P3HA can be suppressed.

The components of the resin composition according to the present invention may be supplied or added to the mixer at a time, or some of the components may first be kneaded and then kneaded with the residual component(s). Particularly, the resin composition according to the present invention is preferably produced by a production process comprising: a first step of melt-kneading the P3HA and the hydrophilic silica (A) to prepare a resin composition; and a second step of melt-kneading the resin composition prepared in the first step with the PBAT. This is because a P3HA domain relatively inferior in tear strength to the PBAT is highly effectively improved, and therefore the tear strength of the composition is highly effectively improved as a whole.

Further, when dispersed in the resin, the plasticizer (B) is preferably added in the first step from the viewpoint of achieving excellent tear strength as described above.

When the plasticizer (B) is blended, the hydrophilic silica (A) and the plasticizer (B) are preferably supplied to the extruder without mixing them in advance. This is because the plasticizer (B) is likely to apply shear to the hydrophilic silica (A).

[Polyester Resin Formed Article]

A polyester resin formed article according to the present invention can be produced by processing the polyester resin composition according to the present invention by any of various processing methods such as extrusion, injection molding, or calender.

When the polyester resin composition according to the present invention is processed into a film or sheet, a known processing method such as film blowing or T-die extrusion can be used. Specific conditions may be appropriately set. However, in the case of for example, film blowing, it is preferred that pellets are dried with a dehumidification dryer or the like before film blowing until their moisture content is reduced to 500 ppm or less, a cylinder preset setting temperature is 100° C. to 160° C., and an adapter preset temperature and a die preset temperature are 130° C. to 160° C.

When processed into a film or sheet, the polyester resin composition according to the present invention can develop high tear strength even in a machine direction in which tear strength tends to be low.

The thickness of the film or sheet is not strictly defined. However, the film generally has a thickness of about 1 to 100 μm, and the sheet generally has a thickness of about larger than 100 μm to 2 mm.

The film or sheet according to the present invention is suitable for use in the fields of agriculture, fishery, forestry, gardening, medicine, sanitary items, food industry, clothing, non-clothing, packaging, automobiles, building materials, etc. For example, the film or sheet is used in applications such as mulching films for agriculture, fumigation sheets for forestry, binding tapes including flat yarns and the like, tree root-wrapping films, back sheets for diapers, packing sheets, shopping bags, garbage bags, draining bags, compost bags, etc.

EXAMPLES

Hereinbelow, the present invention will be more specifically described with reference to examples and comparative examples, but the invention is not limited to these examples.

Production Example

P3HA (raw material A-1) used in the examples was produced in the following manner. It is to be noted that the culture production of the P3HA was performed using KNK-631 strain (see WO 2009/145164).

The composition of a seed medium was: 1 w/v % Meat-extract, 1 w/v % Bacto-Tryptone, 0.2 w/v % Yeast-extract, 0.9 w/v % $Na_2HPO_4.12H_2O$, and 0.15 w/v % $KH_2PO_4$, and the pH of the seed medium was adjusted to 6.8.

The composition of a preculture medium was: 1.1 w/v % $Na_2HPO_4.12H_2O$, 0.19 w/v % $KH_2PO_4$, 1.29 w/v % $(NH_4)_2SO_4$, 0.1 w/v % $MgSO_4.7H_2O$, and 0.5 v/v % trace metal salt solution (prepared by dissolving, in 0.1 N hydrochloric acid, 1.6 w/v % $FeCl_3.6H_2O$, 1 w/v % $CaCl_2.2H_2O$, 0.02 w/v % $CoCl_2.6H_2O$, 0.016 w/v % $CuSO_4.5H_2O$, and 0.012 w/v % $NiCl_2.6H_2O$). Palm kernel oil was added at a time as a carbon source at a concentration of 10 g/L.

The composition of a PHA production medium was: 0.385 w/v % $Na_2HPO_4.12H_2O$, 0.067 w/v % $KH_2PO_4$, 0.291 w/v % $(NH_4)_2SO_4$, 0.1 w/v % $MgSO_4.7H_2O$, 0.5 v/v % trace metal salt solution (obtained by dissolving, in 0.1 N hydrochloric acid, 1.6 w/v % $FeCl_3.6H_2O$, 1 w/v % $CaCl_2.2H_2O$, 0.02 w/v % $CoCl_2.6H_2O$, 0.016 w/v % $CuSO_4.5H_2O$, and 0.012 w/v % $NiCl_2.6H_2O$), and 0.05 w/v % BIOSPUREX 200K (defoaming agent: manufactured by Cognis Japan Ltd.).

First, a glycerol stock (50 μL) of KNK-631 strain was inoculated into the seed medium (10 mL) and seed-cultured for 24 hours. Then, the resulting seed culture was inoculated at 1.0 v/v % into a 3-liter jar fermenter (MDL-300 manufactured by B. E. MARUBISHI Co., Ltd.) containing 1.8 L of the preculture medium. Preculture was performed for 28 hours under operation conditions where a culture temperature was 33° C., a stirring speed was 500 rpm, and a ventilation volume was 1.8 L/min while pH was controlled to be in the range of 6.7 to 6.8. The pH control was performed using a 14% aqueous ammonium hydroxide solution.

Then, the resulting preculture was inoculated at 1.0 v/v % into a 10-liter jar fermenter (MDS-1000 manufactured by B. E. MARUBISHI Co., Ltd.) containing 6 L of the production medium. Culture was performed under operation conditions where a culture temperature was 28° C., a stirring speed was 400 rpm, and a ventilation volume was 6.0 L/min while pH was controlled to be in the range of 6.7 to 6.8. The pH control was performed using a 14% aqueous ammonium hydroxide solution. Palm kernel olein oil was used as a carbon source. The culture was performed for 64 hours. After the completion of the culture, cells were collected by centrifugal separation, washed with methanol, and lyophilized to measure the weight of the dried cells.

One-hundred milliliters of chloroform was added to 1 g of the obtained dried cells, and the resulting mixture was stirred at room temperature all day and night to extract PHA from the cells. The mixture was filtered to remove cell debris, and the resulting filtrate was concentrated by an evaporator until its total volume became 30 mL. Then, 90 mL of hexane was gradually added to the filtrate, and the resulting mixture was allowed to stand for 1 hour while being gently stirred. The mixture was filtered to separate the deposited PHA, and the PHA was vacuum-dried at 50° C. for 3 hours. The 3-hydroxyhexanoate (3HH) content of the obtained PHA was measured by gas chromatography in the following procedure. Twenty milligrams of the dried PHA was mixed with 2 mL of a sulfuric acid-methanol mixed liquid (volume ratio 15:85) and 2 mL of chloroform in a vessel, and the vessel was tightly sealed. Then, the resulting mixture was heated at 100° C. for 140 minutes to obtain a methyl ester of PHA degradation product. After cooling, 1.5 g of sodium hydrogen carbonate was added thereto little by little for neutralization, and the resulting mixture was allowed to stand until generation of carbon dioxide gas was stopped. The mixture was well mixed with 4 mL of diisopropyl ether and then centrifuged. Then, the monomer unit composition of the polyester degradation product in a supernatant was analyzed by capillary gas chromatography. The gas chromatography was performed using GC-17A manufactured by SHIMADZU CORPORATION as a gas chromatograph and NEUTRA BOND-1 (column length: 25 m, column inner diameter: 0.25 mm, liquid film thickness: 0.4 μm) manufactured by GL Sciences Inc. as a capillary column. He gas was used as a carrier gas, a column inlet pressure was set to 100 kPa, and a sample was injected in an amount of 1 μL. As for temperature conditions, the temperature was increased from an initial temperature of 100 to 200° C. at a rate of 8° C./min, and was further increased from 200 to 290° C. at a rate of 30° C./min. As a result of the analysis performed under the above conditions, the PHA was found to be poly(3-hydroxybutyrate-co-3-hydroxyhexanoate) represented by the chemical formula (1). The 3HH content was 11.2 mol %. After the completion of the culture, PHBH was obtained from the culture by the method described in WO 2010/067543. The PHBH had a weight-average molecular weight of 570000 as measured by GPC.

In the examples and comparative examples described later, the following raw materials were also used.

Raw material A-2: PHBH with an Mw of 620000 and a 3HH content of 5.4 mol % (manufactured by KANEKA CORPORATION). The raw material A-2 was obtained in the same procedure as in the above Production Example except that KNK-005 strain (see WO 2008/010296) was used instead of KNK-631 strain.

Raw material B-1: PBAT ("Ecoflex (trademark)" manufactured by BASF).

Raw material C-1: Precipitated silica ("Nipsil (trademark)" LP manufactured by TOSOH SILICA CORPORATION) with a primary particle size of 0.016 μm.

Raw material C-2: Fumed silica ("AEROSIL (trademark)" R972 manufactured by NIPPON AEROSIL CO., LTD.) with a primary particle size of 0.008 μm.

Raw material C-3: Precipitated silica hydrophobized by surface coating with stearic acid The raw material C-3 was prepared by adding 3 wt % of stearic acid (manufactured by Wako Pure Chemical Industries, Ltd., guaranteed reagent) to precipitated silica ("Nipsil (trademark)" LP manufactured by TOSOH SILICA CORPORATION) and stirring the resulting mixture with a Henschel mixer at 80° C. for 30 minutes.

Raw material C-4: Calcium carbonate ("Brilliant (trademark)" 15 manufactured by SHIRAISHI CALCIUM KAISHA, LTD.) with a primary particle size of 0.150 μm.

Raw material D-1: Glycerin ester-based plasticizer ("RIKEMAL (trademark)" PL012 manufactured by RIKEN VITAMIN Co., Ltd.).

Raw material D-2: Adipate-based plasticizer ("Monocizer (trademark)" W242 manufactured by DIC Corporation).

Raw material D-3: Ether ester-based plasticizer ("Monocizer (trademark)" W260 manufactured by DIC Corporation).

Example 1

(Production of Resin Composition)

[First Step]

In order to prepare a resin composition using components shown in Table 1, a silica-containing PHBH resin composition was obtained by melt-kneading the 3-hydroxyalkanoate polymer A-1 as a P3HA component and the precipitated silica C-1 as hydrophilic silica (A) with a twin screw extruder (TEX 30 manufactured by The Japan Steel Works, Ltd.) at a preset temperature of 100 to 130° C. and a screw rotation speed of 100 rpm.

[Second Step]

The silica-containing PHBH resin composition prepared in the first step and the polyester B-1 (PBAT) were melt-kneaded with a twin screw extruder (TEX30 manufactured by The Japan Steel Works, Ltd.) at a preset temperature of 100 to 130° C. and a screw rotation speed of 100 rpm to obtain a polyester resin composition according to the present invention.

(Production of Sheet)

The obtained resin composition was extruded using a single screw extruder, Labo Plastomill (20C200 manufactured by Toyo Seiki Seisaku-sho, Ltd.) equipped with a T-die having a width of 150 mm and a lip of 0.25 mm (T-die extrusion) at a preset temperature of 135° C. and a screw rotation speed of 80 rpm, and was then taken-up by a cooling roll adjusted to 60° C. to obtain a 100 μm-thick sheet.

(Measurement of Tear Strength)

The MD-tear strength of the obtained sheet was measured in accordance with JIS 8116 with an Elmendorf tear strength tester (manufactured by Kumagai Riki Kogyo Co., Ltd.). The result of tear strength measurement is shown in Table 1.

Examples 2 to 4

A biodegradable polyester resin composition and a sheet comprising the resin composition were obtained in the same procedure as in Example 1 except that the types and amounts of the raw materials used were changed as shown in Table 1, and the tear strength of the sheet was measured. The result of tear strength measurement is shown in Table 1.

Examples 5 to 9

A biodegradable polyester resin composition was produced in the same manner as in Example 4 except that a plasticizer (B) was added in the first step. Further, a sheet comprising the resin composition was obtained, and the tear strength of the sheet was measured. The types and amounts of the raw materials used and the result of tear strength measurement are shown in Table 1.

Example 10

A biodegradable polyester resin composition was produced in the same procedure as in Example 4 except that the P3HA was changed to A-2 and a plasticizer (B) was added in the first step. Further, a sheet comprising the resin composition was obtained, and the tear strength of the sheet was measured. The types and amounts of the raw materials used and the result of tear strength measurement are shown in Table 1.

Comparative Examples 1 to 3

A biodegradable polyester resin composition was obtained by melt-kneading the PHBH resin not containing hydrophilic silica (A) with the PBAT in the same procedure as in Example 1, a sheet comprising the resin composition was obtained, and the tear strength of the sheet was measured. The types and amounts of the raw materials used and the result of tear strength measurement are shown in Table 1.

Comparative Example 4

A biodegradable polyester resin composition and a sheet comprising the resin composition were obtained in the same procedure as in Example 4 except that the hydrophilic silica (A) was changed to C-3 subjected to surface treatment, and the tear strength of the sheet was measured. The result of tear strength measurement is shown in Table 1.

Example 11

The raw materials used in Example 5 were blended at a time without obtaining a silica-containing PHBH resin composition in advance, and the resulting mixture was melt-kneaded with a twin screw extruder (TEX30 manufacture by The Japan Steel Works, Ltd.) at a preset temperature of 100 to 130° C. and a screw rotation speed of 100 rpm to produce a biodegradable polyester resin composition. Further, a sheet comprising the resin composition was obtained in the same procedure as in Example 1, and the tear strength of the sheet was measured. The result of tear strength measurement is shown in Table 1.

Example 12

The polyester resin composition obtained in Example 5 was formed into a cylindrical film having a folding width of 400 mm and a thickness of 40 µm with an film blowing machine (manufactured by Hokushin Sangyo Co., Ltd.) (film blowing method) under conditions where a circular die lip thickness was 1 mm, a circular die lip diameter was 100 mm, a preset temperature was 120 to 140° C., and a take-up rate was 8 m/min. The tear strength of the obtained film in the direction of extrusion was measured and found to be 54 mN/µm.

Comparative Example 5

A film was obtained in the same procedure as in Example 12 except that the polyester resin composition used was changed to the biodegradable polyester resin composition obtained in Comparative Example 2. The tear strength of the obtained film in the direction of extrusion was 7 mN/µm.

Comparative Example 6

A biodegradable polyester resin composition and a 100 µm-thick sheet comprising the resin composition were obtained in the same procedure as in Example 1 except that the hydrophilic silica (A) was changed to the calcium carbonate C-4, and the tear strength of the sheet was measured. The result of tear strength measurement is shown in Table 1.

As can be seen from the results of Examples 1 to 4 and Comparative Examples 1 to 3, when a comparison is made between the polyester resin compositions that are the same in the content ratio between the resins, the polyester resin composition containing the hydrophilic silica has improved tear strength as compared to the polyester resin composition containing no silica. Particularly, tear strength tends to be lower when a higher proportion of PHBH excellent in biodegradability is contained. However, tear strength has been improved by adding the hydrophilic silica. It can also be seen that when the hydrophilic silica is added, precipitated silica is more effective in improving tear strength than fumed silica.

Further, it can be seen that the polyester resin compositions of Examples 5 to 10 containing the plasticizer as well as the silica have significantly improved tear strength.

On the other hand, in Comparative Example 4 using the silica whose surface was hydrophobized with stearic acid, tear strength was not improved.

Further, it can be seen that tear strength is more effectively improved by previously melt-kneading the PHBH, the silica, and the plasticizer than by melt-kneading all the raw materials at a time as in Example 11.

Further, it can be seen that even when the polyester resin composition according to the present invention is formed into a film by film blowing as in Example 12, the film has improved tear strength.

TABLE 1

| | Composition | | | | | | | | Preliminary kneading of P3HA and inorganic particles | Film/sheet processing method | Sheet properties | |
|---|---|---|---|---|---|---|---|---|---|---|---|---|
| | P3HA | | PBAT | | Inorganic particles | | Plasticizer | | | | | |
| | Type | Amount (parts by weight) | Type | Amount (parts by weight) | Type | Amount (parts by weight) | Type | Amount (parts by weight) | | | Sheet thickness (μm) | Tear strength (mN/μm) |
| Example 1 | A-1 | 40 | B-1 | 60 | C-1 | 10 | — | — | Done | T-die extrusion | 100 | 20 |
| Example 2 | A-1 | 40 | B-1 | 60 | C-1 | 4 | — | — | Done | T-die extrusion | 100 | 19 |
| Example 3 | A-1 | 40 | B-1 | 60 | C-2 | 10 | — | — | Done | T-die extrusion | 100 | 17 |
| Example 4 | A-1 | 50 | B-1 | 50 | C-1 | 13 | — | — | Done | T-die extrusion | 100 | 13 |
| Example 5 | A-1 | 50 | B-1 | 50 | C-1 | 13 | D-1 | 8 | Done | T-die extrusion | 100 | 51 |
| Example 6 | A-1 | 50 | B-1 | 50 | C-1 | 13 | D-1 | 3 | Done | T-die extrusion | 100 | 19 |
| Example 7 | A-1 | 50 | B-1 | 50 | C-1 | 13 | D-1 | 13 | Done | T-die extrusion | 100 | 93 |
| Example 8 | A-1 | 50 | B-1 | 50 | C-1 | 13 | D-2 | 8 | Done | T-die extrusion | 100 | 24 |
| Example 9 | A-1 | 50 | B-1 | 50 | C-1 | 13 | D-3 | 8 | Done | T-die extrusion | 100 | 31 |
| Example 10 | A-2 | 50 | B-1 | 50 | C-1 | 13 | D-1 | 10 | Done | T-die extrusion | 100 | 13 |
| Example 11 | A-1 | 50 | B-1 | 50 | C-1 | 13 | D-1 | 8 | Not done | T-die extrusion | 100 | 34 |
| Example 12 | A-1 | 50 | B-1 | 50 | C-1 | 13 | D-1 | 8 | Done | film blowing | 40 | 54 |
| Comparative Example 1 | A-1 | 40 | B-1 | 60 | — | — | — | — | — | T-die extrusion | 100 | 13 |
| Comparative Example 2 | A-1 | 50 | B-1 | 50 | — | — | — | — | — | T-die extrusion | 100 | 9 |
| Comparative Example 3 | A-2 | 50 | B-1 | 50 | — | — | — | — | — | T-die extrusion | 100 | 7 |
| Comparative Example 4 | A-1 | 50 | B-1 | 50 | C-3 | 13 | — | — | Done | T-die extrusion | 100 | 9 |
| Comparative Example 5 | A-1 | 50 | B-1 | 50 | — | — | — | — | — | film blowing | 40 | 7 |
| Comparative Example 6 | A-1 | 40 | B-1 | 60 | C-4 | 10 | — | — | Done | T-die extrusion | 100 | 13 |

The invention claimed is:

1. A biodegradable polyester resin composition, comprising:
    an aliphatic polyester (P3HA) having a repeating unit represented by formula (1):
    [—CHR—CH$_2$—CO—O—]     (1),
        wherein R is an alkyl group represented by C$_n$H$_{2n+1}$, where n is an integer of 1 or more and 15 or less;
    polybutylene adipate terephthalate (PBAT);
    hydrophilic silica (A); and
    at least one plasticizer (B), which is selected from glycerin ester-based compounds,
    wherein a weight ratio of the aliphatic polyester (P3HA) to the polybutylene adipate terephthalate (PBAT) is 40/60 to 50/50,
    wherein an amount of the hydrophilic silica (A) contained is 4 to 13 parts by weight with respect to 100 parts by weight of a total amount of the aliphatic polyester (P3HA) and the polybutylene adipate terephthalate (PBAT) combined, and
    wherein an amount of the plasticizer (B) contained is 4 to 13 parts by weight with respect to 100 parts by weight of the total amount of the aliphatic polyester (P3HA) and the polybutylene adipate terephthalate (PBAT) combined.

2. The polyester resin composition according to claim 1, wherein the aliphatic polyester (P3HA) is at least one selected from the group consisting of poly(3-hydroxybutyrate-co-3-hydroxyhexanoate) (PHBH), poly(3-hydroxybutyrate) (P3HB), poly(3-hydroxybutyrate-co-3-hydroxyvalerate) (PHBV), poly(3-hydroxybutyrate-co-4-hydroxybutyrate) (P3HB4HB poly(3-hydroxybutyrate-co-3-hydroxyoctanoate), and poly(3-hydroxybutyrate-co-3-hydroxyoctadecanoate).

3. The polyester resin composition according to claim 1, wherein the hydrophilic silica (A) is precipitated silica.

4. A polyester resin formed article obtained from the aliphatic polyester resin composition according to claim 1.

5. The polyester resin formed article according to claim 4, which is in the form of film or sheet.

6. A method for producing the polyester resin composition according to claim 1 comprising:
    melt-kneading the aliphatic polyester (P3HA), the hydrophilic silica (A), and the plasticizer (B) to prepare a first resin composition; and then
    melt-kneading the first resin composition with the polybutylene adipate terephthalate (PBAT).

* * * * *